United States Patent [19]
Miyamoto

[11] Patent Number: 5,982,855
[45] Date of Patent: *Nov. 9, 1999

[54] AUTOMATIC TELEPHONE ANSWERING APPARATUS

[75] Inventor: Hiroshi Miyamoto, Chiba, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/494,680

[22] Filed: Jun. 26, 1995

[30] Foreign Application Priority Data

Jun. 28, 1994 [JP] Japan ................................. 6-146725

[51] Int. Cl.⁶ .................................................. H04M 1/64
[52] U.S. Cl. ................. 379/67.1; 379/88.01; 379/88.12; 379/88.17; 379/18.18; 379/88.24; 379/93.01; 379/158; 379/202; 379/209; 379/215
[58] Field of Search ................................ 379/67, 88, 89, 379/67.1, 88.01, 88.04, 93.01, 88.22, 88.12, 88.17, 88.18, 88.24, 93.21, 93.35, 158, 202, 209, 215

[56] References Cited

U.S. PATENT DOCUMENTS

| | | | |
|---|---|---|---|
| 4,625,081 | 11/1986 | Lotito et al. | 379/88 |
| 4,757,525 | 7/1988 | Matthews et al. | 379/89 |
| 5,155,761 | 10/1992 | Hammond | 379/67 |
| 5,327,486 | 7/1994 | Wolff et al. | 379/96 |
| 5,400,393 | 3/1995 | Knuth et al. | 379/88 |
| 5,521,964 | 5/1996 | Schull et al. | 379/67 |
| 5,526,406 | 6/1996 | Luneau | 379/61 |
| 5,557,658 | 9/1996 | Gregorek et al. | 379/67 |

*Primary Examiner*—Fan S. Tsang
*Assistant Examiner*—Allan Hoosain
*Attorney, Agent, or Firm*—Jay H. Maioli

[57] ABSTRACT

Messages can be exchanged between two callers with ease by using an automatic telephone answering apparatus without calling the automatic telephone answering apparatus repeatedly. An automatic telephone answering apparatus which can automatically answer an incoming call includes a recording/reproducing unit (6) for recording an incoming call which the apparatus automatically answers, a call sound identifying circuit (8) for identifying a call sound contained in the incoming call signal, an identifying circuit (7) for identifying a predetermined control signal contained in the incoming call signal, and a flash switch (9) for temporarily opening a telephone line when the identifying circuits (7), (8) identify the call sound or the predetermined control signal. When the flash switch (9) temporarily opens the telephone line on the basis of identified results supplied thereto from the identifying circuits (7) and (8), the recording/reproducing unit (6) reproduces the incoming call signal recorded last. After the recording/reproducing unit (6) has reproduced the incoming call signal recorded last, the recording/reproducing unit (6) records an incoming call signal until the control signal identifying circuit (7) identifies the predetermined control signal.

4 Claims, 2 Drawing Sheets

F I G. 1
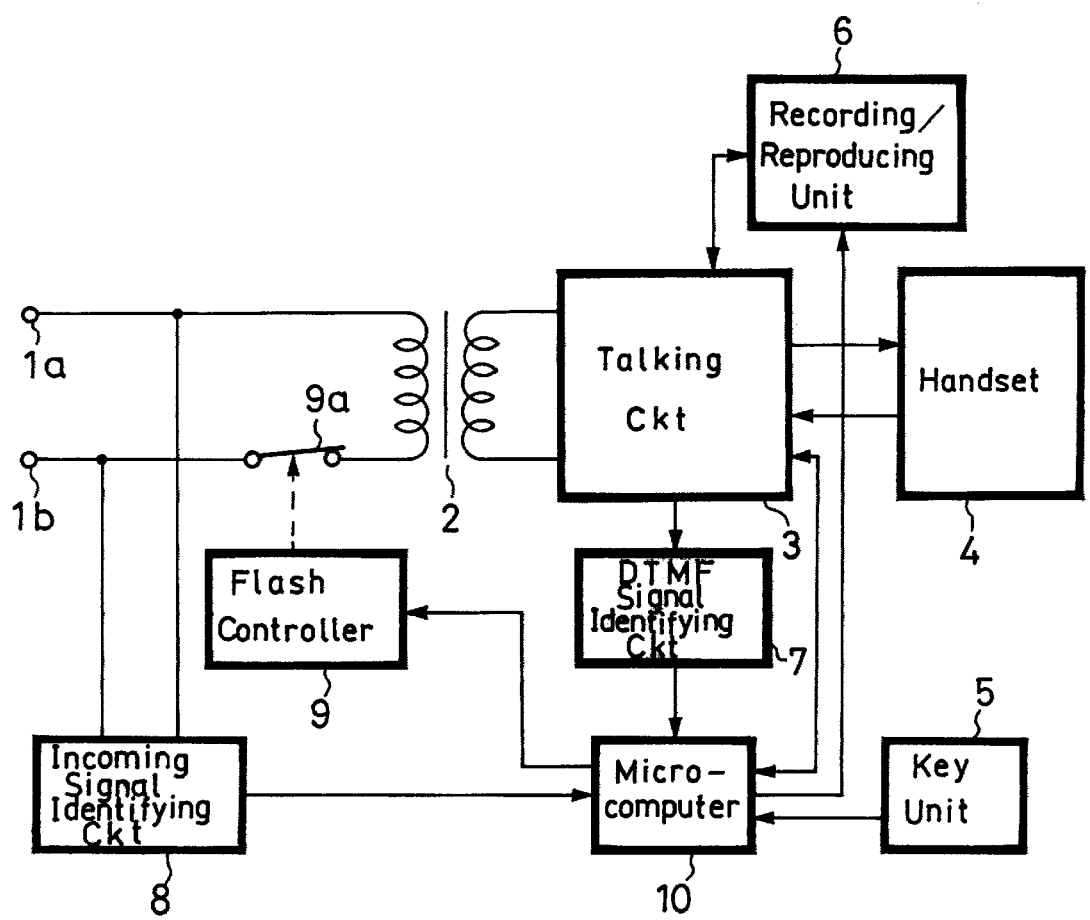

AUTOMATIC TELEPHONE ANSWERING APPARATUS

BACKGROUND OF THE INVENTION

The present invention relates to automatic telephone answering apparatus and, particularly to an automatic telephone answering apparatus having a private message function and a call waiting function.

A variety of automatic telephone answering apparatus are developed so far to be able to automatically answer an incoming call during the user's absence.

This type of automatic telephone answering apparatus includes a recording unit composed of a tape recorder or a semiconductor memory to record an audio message. The recording unit of the automatic telephone answering apparatus is able to automatically send an outgoing message (hereinafter simply referred to as "OGM") so as to answer an incoming call and is able to record an incoming message (hereinafter simply referred to as "ICM") during the user's absence.

On the other hand, some automatic telephone answering apparatus have a function called a remote playback function to enable the owner to hear an ICM from the place where the owner has gone. Specifically, when the automatic telephone answering apparatus receives an incoming call during the owner's absence under the condition that an ICM was already recorded in the recording unit of the automatic telephone answering apparatus, if a predetermined control signal based on a DTMF (dual-tone multifrequency) signal is transmitted from an incoming call signal to the automatic telephone answering apparatus, then the automatic telephone answering apparatus can reproduce the ICM recorded on the recording unit.

Further, automatic telephone answering apparatus having a private message function also are commercially available on the market. The private message function is one of applications of the above-mentioned remote playback function.

According to the private message function, the owner of the automatic telephone answering apparatus prepares and records a private message for particular person (e.g., family, friend or secretary) on the automatic telephone answering apparatus. When the owner records a private message at home, the owner can record a private message on a tape at its particular position or in a semiconductor memory at its particular area from a microphone incorporated in the automatic telephone answering apparatus by depressing a private message recording button. If the owner wishes to record a private message from the place where the owner has gone, the owner is able to do the above recording by controlling the automatic telephone answering apparatus with a previously-set recording password (e.g., 2-digit input entered by keys) transmitted to the automatic telephone answering apparatus through a telephone line.

The owner of this automatic telephone answering apparatus sets a private message reproducing password (e.g., different 2-digit input entered by keys) on behalf of only the above particular person. When the private message reproducing password is input to the automatic telephone answering apparatus, only the particular position on the tape or the particular area of the semiconductor memory is reproduced with the result that only the private message that has been prepared for the particular person can be reproduced. Therefore, even when a number of ICMs for the owner are recorded on the automatic telephone answering apparatus, the ICMs cannot be reproduced by other person so long as other person does not learn the private message reproducing password. Thus, the ICMs can be protected. Moreover, if the particular person learns the private message recording password from the owner, then the particular person can leave an answering private message for the owner by sending a control signal to the automatic telephone answering apparatus so as to rewrite the private message. With this private message function, the owner and the particular person can communicate with each other from the places where they have gone by the automatic telephone answering apparatus.

However, after the owner has left the private message to the particular person by using the private message function from the place where the owner had gone, if the particular person wishes to answer the owner's private message, then the owner has to call the automatic telephone answering apparatus one more time in order to hear the recorded particular person's private message. Thus, the owner and the particular person have to make a call many time.

SUMMARY OF THE INVENTION

In view of the aforesaid aspect, it is an object of the present invention to provide an automatic telephone answering apparatus having both a private message function and a call waiting function.

It is another object of the present invention to provide an automatic telephone answering apparatus in which a private message can be transmitted and received with ease by repeatedly recording and reproducing private messages without calling the automatic telephone answering apparatus many times.

According to an aspect of the present invention, there is provided an automatic telephone answering apparatus for automatically answering an incoming call. This automatic telephone answering apparatus is comprised of a recording and reproducing unit for recording an incoming call which the apparatus automatically answers, a first identifying circuit for identifying a predetermined control signal contained in the incoming call, a second identifying circuit for identifying a call waiting incoming signal during a circuit is connected, and a flash switch for temporarily opening a telephone line when the first and second identifying circuits identify the predetermined control signal and the call waiting incoming signal, wherein the recording and reproducing unit reproduces a content of an incoming call recorded last when the flash switch temporarily opens a telephone line on the basis of identified results supplied thereto from the first and second identifying circuits and the recording and reproducing unit records an incoming call signal until the first identifying circuit identifies the predetermined control signal after the content of incoming call has been reproduced by the recording and reproducing unit.

Further, in this case, the first identifying circuit for identifying the control signal identifies a DTMF (dual-tone multifrequency) signal of a predetermined format.

Furthermore, in this case, the flash means temporarily opens a telephone line when the second identifying circuit identifies a call waiting sound after the first identifying circuit for identifying the control signal has identified the control signal.

According to the present invention, when the telephone line of this automatic telephone answering apparatus is subscribed in the call waiting service, a first person who calls the automatic telephone answering apparatus records a message in the recording/reproducing unit of the automatic telephone answering apparatus and awaits for an incoming call. In this state, when another person calls the automatic telephone answering apparatus, the identifying circuit provided within the automatic telephone answering apparatus identifies the call waiting incoming signal and the flash switch is energized to temporarily open the telephone line. Then, the exchange side connects the second caller to the automatic telephone answering apparatus. The message that had been recorded in the recording/reproducing unit of the automatic telephone answering apparatus by the first caller is reproduced and a reproduced message is sent to the second caller. After the message that had been recorded in the recording/reproducing unit was reproduced, the recording/reproducing unit records an answer to the reproduced message by recording an incoming call. After this answer was recorded by the recording/reproducing unit, when the second caller transmits the predetermined control signal to the automatic telephone answering apparatus, the flash switch is energized to temporarily open the telephone line thereby to connect the automatic telephone answering apparatus to the first caller. Thus, the answer that has been recorded by the recording/reproducing unit is transmitted to the first caller.

Accordingly, the message and the answer can be transmitted between the first caller and the second caller through the single automatic telephone answering apparatus. Therefore, they can transmit and receive the messages by calling the automatic telephone answering apparatus once. In other words, it becomes possible to exchange the messages between the first caller and the second caller when they call the single automatic telephone answering apparatus at the same time from the places where they have gone. For example, public telephones can exchange messages through the automatic telephone answering apparatus.

Further, since the control signal identifying circuit identifies the DTMF signal of the predetermined format, the person who called this automatic telephone answering apparatus can easily transmit the control signal only by operating the dialing keys of the telephone.

Furthermore, the flash switch temporarily opens the telephone line when the call waiting incoming signal identifying circuit identifies the call waiting incoming signal after the control signal identifying circuit has identified the predetermined control signal. Therefore, a message can be transmitted only if the predetermined control signal is transmitted to the automatic telephone answering apparatus when the automatic telephone answering apparatus receives an incoming call. Thus, it is possible to prevent the automatic telephone answering apparatus from malfunctioning. Also, it is possible to prevent a recorded private message from being wiretapped.

BRIEF DESCRIPTION OF THE DRAWINGS

FIG. 1 is a block diagram schematically showing an automatic telephone answering apparatus according to an embodiment of the present invention.

DETAILED DESCRIPTION OF THE PREFERRED EMBODIMENT

Figure 2:
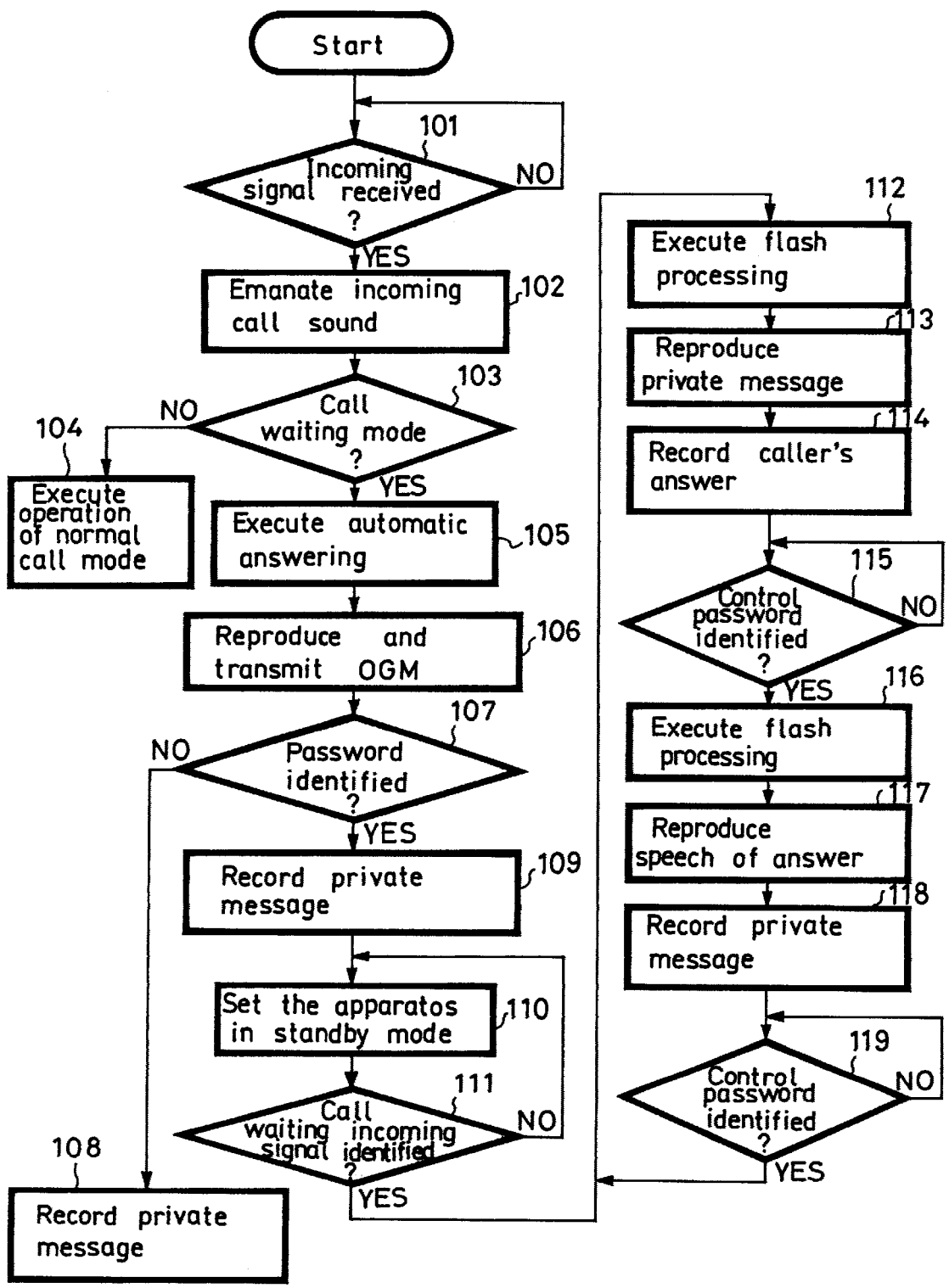
FIG. 2 is a flowchart to which references will be made in explaining an operation of the automatic telephone answering apparatus shown in FIG. 1.

An automatic telephone answering apparatus according to an embodiment of the present invention will hereinafter be described with reference to the drawings.

FIG. 1 of the accompanying drawings shows in block diagram form a circuit arrangement of an automatic telephone answering apparatus according to an embodiment of the present invention.

As shown in FIG. 1, the automatic telephone answering apparatus according to this embodiment includes terminals 1a, 1b connected to a telephone line (not shown). A signal transmitted from an exchange through the telephone line to the terminals 1a, 1b is supplied through a transformer 2 to a talking circuit 3. The talking circuit 3 receives an incoming signal supplied thereto through the telephone line and transmits an outgoing signal to the telephone line side. The owner can answer an incoming call with a microphone (not shown) and a speaker (not shown) disposed within a handset 4 connected to the talking circuit 3.

This automatic telephone answering apparatus can receive an incoming call and make an outgoing call under the control of a CPU (central processing unit) 10 composed of a microcomputer. The automatic telephone answering apparatus includes a key unit 5 having a key pad on which dial keys, such as 0, 1, 2, ... 9, *, # and a variety of function keys are provided. Information obtained when each of the keys is operated is supplied to the microcomputer 10.

The automatic telephone answering apparatus according to this embodiment includes a recording/reproducing unit 6 which is indispensable for the automatic telephone answering apparatus. Herein, let it be assumed that the recording/reproducing unit 6 is able to record OGMs and ICMs using a solid-state semiconductor memory, for example. If the automatic telephone answering apparatus receives an incoming call in the call waiting mode, then the automatic telephone answering apparatus answers the incoming call with an OGM (e.g., "Hello, this is ... speaking and I'm not at home. So, please record your message.") that was previously recorded in the recording/reproducing unit 6. Moreover, the recording/reproducing unit 6 can record an ICM. These operations of the automatic telephone answering apparatus can be made under the control of the microcomputer 10.

The talking circuit 3 is connected with a DTMF (dual-tone multifrequency) signal identifying circuit 7 which identifies a DTMF signal (signal having multiple frequency in which a combination of frequencies is set for every dial key). The DTMF signal identifying circuit 7 supplies corresponding identified data to the microcomputer 10 when it identifies a DTMF signal as a DTMF signal in which a predetermined combination of frequencies is set. There are separately set a DTMF signal train (i.e., incoming signal alternate call mode setting password) for setting the incoming signal alternate call mode and a DTMF signal train (i.e., incoming call switching control password) which designates a switching of an incoming call.

In the automatic telephone answering apparatus according to this embodiment, an incoming signal identifying circuit 8 is directly connected to the terminals 1a, 1b. The incoming signal identifying circuit 8 identifies whether or not a call tone signal transmitted through the telephone line contains a call waiting signal.

A switch 9 is connected between the terminals 1a, 1b connected to the telephone line and the transformer 2. This switch 9 is what might be called a flash switch. The switch 9a can be opened temporarily under the control of a flash controller 9. When the flash switch 9a is opened temporarily, if the telephone line of this automatic telephone answering apparatus is subscribed in a so-called call waiting service, then the exchange to which this automatic telephone answering apparatus is connected detects that the flash switch 9a is temporarily opened. Thus, the exchange switches the connection of the telephone line. The flash control circuit 9 is operated under the control of the microcomputer 10.

Although this automatic telephone answering apparatus includes various other circuits, such as a hook switch and an incoming call detector, they are not directly related to the operation of this embodiment and therefore need not be shown in FIG. 1.

A control operation executed by the microcomputer 10 of the automatic telephone answering apparatus according to this embodiment will be described below with reference to a flowchart of FIG. 2. In the following description, let it be assumed that the telephone line to which this automatic telephone answering apparatus is connected is subscribed in the call waiting service. According to the call waiting service, when the automatic telephone answering apparatus receives another incoming call while this automatic telephone answering apparatus is connected to one incoming call, a call waiting incoming signal is transmitted from the exchange to the automatic telephone answering apparatus. When the exchange detects that a flash processing is carried out by the automatic telephone answering apparatus, the exchange connects the automatic telephone answering apparatus to the other incoming signal and one incoming signal is placed in the standby mode. Therefore, one incoming signal and the other incoming signal can be alternately switched by flash processing.

Referring to FIG. 2, following the start of operation, it is determined in decision step 101 by the microcomputer 10 whether or not this automatic telephone answering apparatus receives an incoming call from the telephone line side. If an incoming call is not received by the automatic telephone answering apparatus as represented by a NO at decision step 101, then the processing returns to decision step 101 and the step 101 is repeated, i.e., the automatic telephone answering apparatus is set in the standby mode to await an incoming signal. If the incoming signal is received by the automatic telephone answering apparatus as represented by a YES at decision step 101, then the processing proceeds to step 102, where a speaker (not shown) of this automatic telephone answering apparatus emanates an incoming call sound. Then, it is determined in the next decision step 103 by the microcomputer 10 whether or not the present operation mode set in the automatic telephone answering apparatus is the call waiting mode.

If the automatic telephone answering apparatus is not placed in the call waiting mode as represented by a NO at decision step 103, then the processing proceeds to step 104, where the automatic telephone answering apparatus executes an operation of the normal call mode. Specifically, an incoming call sound is kept being emanated from the speaker of the automatic telephone answering apparatus until the automatic telephone answering apparatus is set to the offhook state after the owner has lifted the handset 4 from a handset cradle (not shown). When the automatic telephone answering apparatus is set in the offhook state, the microphone and the speaker (both of which are not shown) are connected to the telephone line side to make a call between the owner and the caller.

If on the other hand the automatic telephone answering apparatus is placed in the call waiting mode as represented by a YES at decision step 103, then the processing proceeds to step 105, where the automatic telephone answering apparatus is connected to the telephone line of the incoming signal to automatically answer the incoming call under the control of the microcomputer 10. Then, the processing proceeds to step 106, where an OGM that was previously recorded on the recording/reproducing unit 6 is reproduced under the control of the microcomputer 10 and the reproduced OGM is transmitted to the caller connected to the owner via the telephone line. It is determined in the next decision step 107 by the microcomputer 10 whether or not the DTMF signal identifying circuit 7 identifies the incoming signal alternate call mode setting password during or after the OGM is transmitted.

If the DTMF signal train of the incoming signal alternate call mode setting password is not transmitted as represented by a NO at decision step 107, then the processing proceeds to step 108, where the OGM is reproduced and then a private message of the caller is recorded by the recording/reproducing unit 6. Then, the automatic telephone answering apparatus is operated as the ordinary telephone answering apparatus to disconnect the telephone line.

If on the other hand the DTMF signal identifying circuit 7 identifies the incoming signal alternate call mode setting password as represented by a YES at decision step 107, then the processing proceeds to step 109, where the operation mode of the automatic telephone answering apparatus becomes the incoming signal alternate call mode until the telephone line is disconnected. Then, a private message of the caller is recorded on a predetermined area of a recording medium by the recording/reproducing unit 6. Then, the processing proceeds to step 110, whereat after the private message was recorded on the predetermined area of the recording medium by the recording/reproducing unit 6, the automatic telephone answering apparatus is set in the standby mode under the mute state.

In the next decision step 111, it is determined by the microcomputer 10 whether or not the call waiting incoming signal identifying circuit 8 identifies the call waiting incoming signal. If the call waiting incoming signal identifying circuit 8 identifies the call waiting incoming signal as represented by a YES at decision step 111, then the processing proceeds to step 112, where the microcomputer 10 supplies a command signal to the flash controller 9 to enable the flash controller 9 to perform the flash operation, i.e., to temporarily open the flash switch 9a.

Since the telephone line to which the automatic telephone answering apparatus is connected is subscribed for the call waiting service as described above, if the call waiting signal identifying circuit 8 identifies the call waiting incoming signal, then this corresponds to the case that the automatic telephone answering apparatus receives other incoming call. Therefore, the flash switch 9a is temporarily opened under the control of the flash controller 9 and the exchange switches the present incoming call to other incoming call.

Then, the processing proceeds to step 113, where a latest private message (i.e., private message recorded at step 109) recorded by the recording/reproducing unit 6 is reproduced for the switched incoming call under the control of the microcomputer 10. Then, the reproduced private message is transmitted to the caller connected to the automatic telephone answering apparatus through the telephone line. When the playback of this private message is finished, the processing proceeds to step 114, where the microcomputer 10 controls the recording/reproducing unit 6 such that the recording and/reproducing unit 6 records a speech (answer) of the caller connected to the automatic telephone answering apparatus via the telephone line. Then, after the call speech of the caller has been recorded by the recording/reproducing unit 6, it is determined in the next decision step 115 by the microcomputer 10 whether or not the DTMF signal identifying circuit 7 identifies the incoming signal switching control password.

If the DTMF signal identifying circuit 7 identifies the incoming signal switching control password as represented by a YES at decision step 115, then the processing proceeds to step 116, where the microcomputer 10 supplies a command signal to the flash controller 9 to execute the flash processing in which the flash switch 9a is temporarily opened. Since the flash processing is executed, the exchange switches the currently connected incoming call to an incoming call that is placed in the standby mode.

In the next step 117, on the automatic telephone answering apparatus, the recording/reproducing unit 6 reproduces the latest speech of answer recorded by the recording/reproducing unit 6 (i.e., answer recorded at step 114) under the control of the microcomputer 10. Then, the reproduced answer is transmitted to the caller connected to the automatic telephone answering apparatus via the telephone line. After the reproduction of the answer was finished, the processing proceeds to the next step 118, where the microcomputer 10 controls the recording/reproducing unit 6 such that the recording/reproducing unit 6 records a speech (another private message) of the caller connected to the automatic telephone answering apparatus through the telephone line. After the above private message was recorded by the recording/reproducing unit 6, the processing proceeds to the next decision step 119, where it is determined by the microcomputer 10 whether or not the DTMF signal identifying circuit 7 identifies the incoming signal switching control password.

If the DTMF signal identifying circuit 7 identifies the incoming switching control password as represented by a YES at decision step 119, then the processing returns to step 112, where the microcomputer 10 supplies the command signal to the flash controller 9 to execute the flash processing in which the flash switch 9a is opened temporarily. Then, the steps 112 to 119 are repeated until the telephone line is disconnected (i.e., until the caller connected to the automatic telephone answering apparatus via the telephone network hangs up).

According to the inventive automatic telephone answering apparatus in which the processing is executed as described above, two persons can easily communicate with each other from the place where they have gone by using this automatic telephone answering apparatus when both of them are not at home. Specifically, when two persons A and B wish to contact each other from the places where they have gone, initially, the two persons A and B agree in advance when to contact with each other. Then, a little before the appointed time (e.g., about one minute before), the person A makes a call to the automatic telephone answering apparatus from the place where the person A has gone. When the automatic telephone answering apparatus is set in the call waiting mode, the automatic telephone answering apparatus automatically answers an incoming call and an OGM is reproduced. At that time, the person A enters an incoming signal alternate call mode setting password by operating dial keys of the telephone that the person A uses and transmits the same to the automatic telephone answering apparatus. Assume now that "1234", for example, is set as the password.

If the DTMF signal identifying circuit 7 identifies the password "1234", then this automatic telephone answering apparatus continues being operated in the incoming signal alternate call mode until this telephone call is finished and a private message of the person A is recorded on the recording/reproducing unit 6. Let it be assumed that the private message of the person A is "Would you please see me at four o'clock in the office?".

Then, when the person B calls the automatic telephone answering apparatus at the appointed time, the exchange transmits a predetermined call waiting incoming signal to the automatic telephone answering apparatus. If the call waiting incoming signal identifying circuit 8 identifies the predetermined call waiting incoming signal, then the microcomputer 10 supplies a command signal to the flash controller 9 such that the flash switch 9a is opened temporarily. Accordingly, the exchange connects the line of the person B to the automatic telephone answering apparatus and holds the line of the person A.

When the line of the person B is connected to the automatic telephone answering apparatus, the recording/reproducing unit 6 reproduces the person A's private message "Would you please see me at four o'clock in the office?" and this private message is transmitted to the person B. When the person B answers this private message, the answer of the person B is recorded on the recording/reproducing unit 6. Let it be assumed that the answer of the person B is "I finished the work as soon as I expected. So, I can see you earlier. Could you see me at three o'clock?", for example. After the person B answered the private message of the customer A, the person B enters the incoming signal switching control password by operating the dial keys of the telephone that the person B uses and transmits the same to the automatic telephone answering apparatus. Therefore, when the automatic telephone answering apparatus receives the control password, the microcomputer 10 supplies a command signal to the flash controller 9 so that the flash switch 9a is temporarily opened under the control of the flash controller 9. Thus, the exchange connects the line of the person A to the automatic telephone answering apparatus and holds the line of the person B.

When the automatic telephone answering apparatus is connected to the line of the person A, the recording/reproducing unit 6 reproduces the answer of the person B, i.e., "I finished the work as soon as I expected. So, I can see you earlier. Could you see me at three o'clock?" and this answer, i.e., private message of the person B is transmitted to the person A. If the person A wishes to answer the reproduced private message of the person B, then the person A makes the next private message and this private message is recorded on the recording/reproducing unit 6. Thereafter, the person A enters the incoming signal switching control password by operating the dial keys and the line is again switched to the line of the person B. This operation is repeated until the persons A and B finish their business.

According to the inventive automatic telephone answering apparatus, a message and an answer can be transmitted between the first caller and the second caller through the single automatic telephone answering apparatus. Thus, the first and second callers can tell their messages to each other when they call the automatic telephone answering apparatus once.

Therefore, even when two persons are not at home, if they call the automatic telephone answering apparatus from the places where they have gone by public telephones, then it becomes possible for the two persons to talk each other with public telephones.

While the state that the above recording/reproducing unit 6 is in use was not described so far, if the recording/reproducing unit 6 can erase the recorded private message and answer once they are reproduced, then it is possible to effectively utilize a storage capacity of the recording/reproducing unit 6. Moreover, while the semiconductor memory is used as the recording/reproducing unit 6 as described above, the present invention is not limited thereto and the recording/reproducing unit 6 may be composed of other recording media, such as a magnetic tape and a magneto-optical disc.

Further, while the customer makes a call after the customer has set the incoming signal alternate call mode by entering the password as described above, the present invention is not limited thereto and the password need not always be entered. However, if the customer sets the incoming signal alternate call mode by entering the password, then it is possible to prevent a call from being made erroneously and illegally.

Furthermore, the automatic telephone answering apparatus according to this embodiment may be modified as a cordless type automatic telephone answering apparatus for making a telephone call between a handset and a base station via radio waves.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An automatic telephone answering apparatus for exchanging a plurality of messages between a first caller and a second caller using a telephone line subscribed to a call waiting service by having said first and second callers make only one telephone call each to said telephone answering apparatus, said telephone answering apparatus comprising:

recording and/or reproducing means for recording and/or reproducing said messages;

first identifying means for identifying a password entered by one of said first and second callers;

second identifying means for identifying a call waiting signal sent by said call waiting service to said telephone line while said telephone line is being used by one of said first and second callers;

flash control means for automatically switching the use of said telephone line from one of said first caller to said second caller and said second caller to said first caller in response to an output from one of said first and second identifying means; and control means for controlling said flash control means and said recording and/or reproducing means and being fed outputs from said first and second identifying means, wherein when said first caller calls said telephone answering apparatus and said first identifying means identifies said password, said recording and/or reproducing means records a private message from said first caller, and after said private message has been recorded said first caller stays on said telephone line and when said second identifying means identifies said call waiting signal while said first caller is holding said telephone line, said flash control means switches the use of said telephone line from said first caller to said second caller and said recording and/or reproducing means reproduces said private message, and after said private message has been reproduced said second caller records an answer to said first private message, and when said first identifying means identifies said password entered by said second caller said flash control means switches the use of said telephone line from said second caller to said first caller and said recording and/or reproducing means reproduces said answer to said first caller while said second caller is holding said telephone line.

2. The automatic telephone answering apparatus according to claim 1, wherein said first identifying means identifies a dual-tone-multifrequency signal.

3. A method for exchanging a plurality of messages between a first caller and a second caller using a telephone line subscribed to a call waiting service by having said first and second callers make only one telephone call each, the method comprising the steps of:

recording and/or reproducing said messages;

identifying a password entered by one of said first and second callers;

identifying a call waiting signal sent by said call waiting service said waiting service to said telephone line while said telephone line is being used by one of said first and second callers;

automatically switching the use of said telephone line from one of said first caller to said second caller and said second caller to said first caller in response to an output from one of said identifying a password step and said identifying a call waiting signal step; and controlling said automatically switching and said recording and/or reproducing steps with outputs from said identifying steps, wherein when said first caller calls and said identifying a password step identifies said password, said recording and/or reproducing step records a private message from said first caller, and after said private message has been recorded said first caller stays on said telephone line and when said identifying a call waiting signal step identifies said call waiting signal while said first caller is holding said telephone line, said automatically switching step switches the use of said telephone line from said first caller to said second caller and said recording and/or reproducing step reproduces said private message, and after said private message has been reproduced said second caller records an answer to said first private message, and when said identifying a password step identifies said password entered by said second caller said automatically switching step switches the use of said telephone line from said second caller to said first caller and said recording and/or reproducing step reproduces said answer to said first caller while said second caller is holding said telephone line.

4. The method for exchanging messages according to claim 3, wherein said identifying step for identifying said password identifies a dual-tone-multifrequency signal.

* * * * *